Dec. 26, 1967    J. H. ANDERSON    3,360,001
VACUUM JACKETED PIPE LINE AND JOINT CONSTRUCTION THEREFOR
Filed March 17, 1965    2 Sheets-Sheet 1
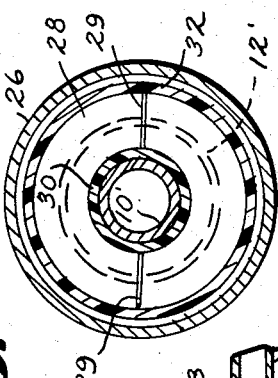
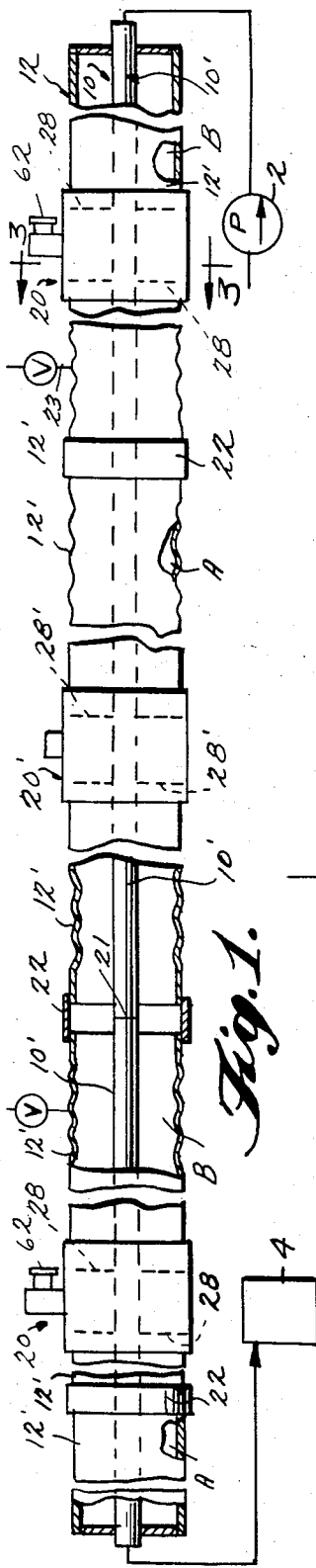
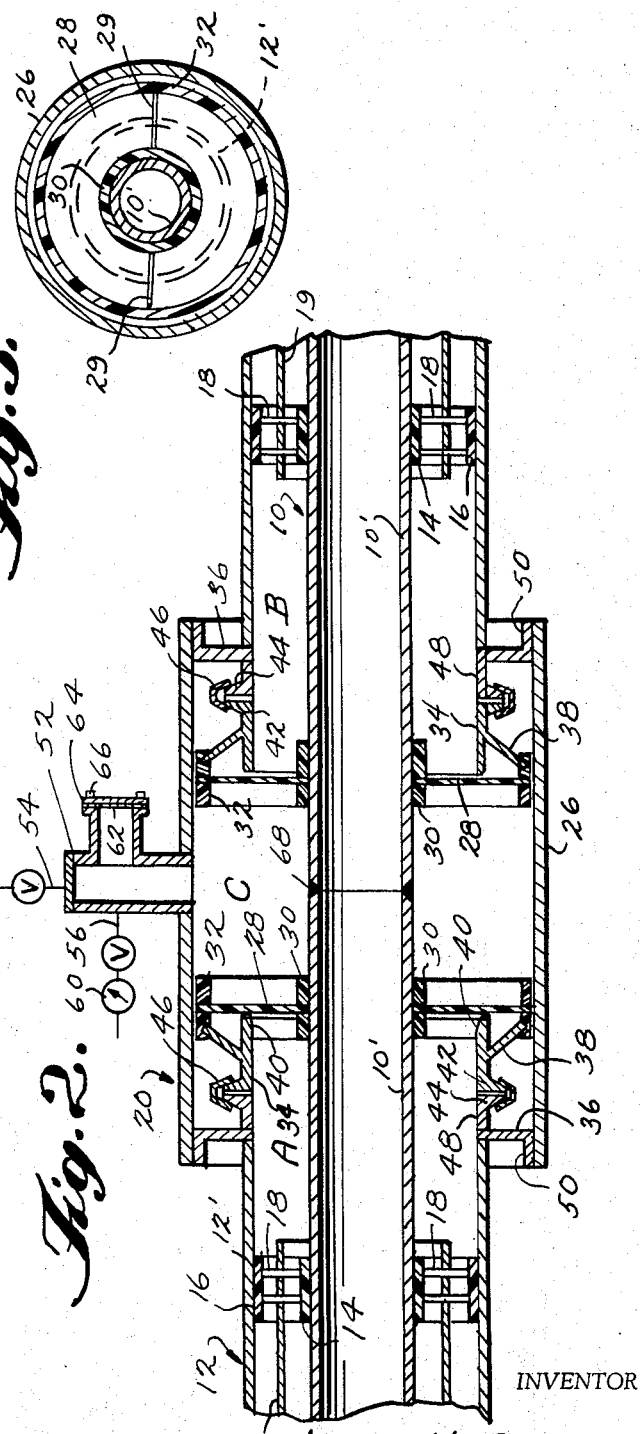
INVENTOR
JAMES H. ANDERSON
BY Cushman, Darby & Cushman
ATTORNEYS Dec. 26, 1967     J. H. ANDERSON     3,360,001
VACUUM JACKETED PIPE LINE AND JOINT CONSTRUCTION THEREFOR
Filed March 17, 1965     2 Sheets-Sheet 2
*Fig. 4.*
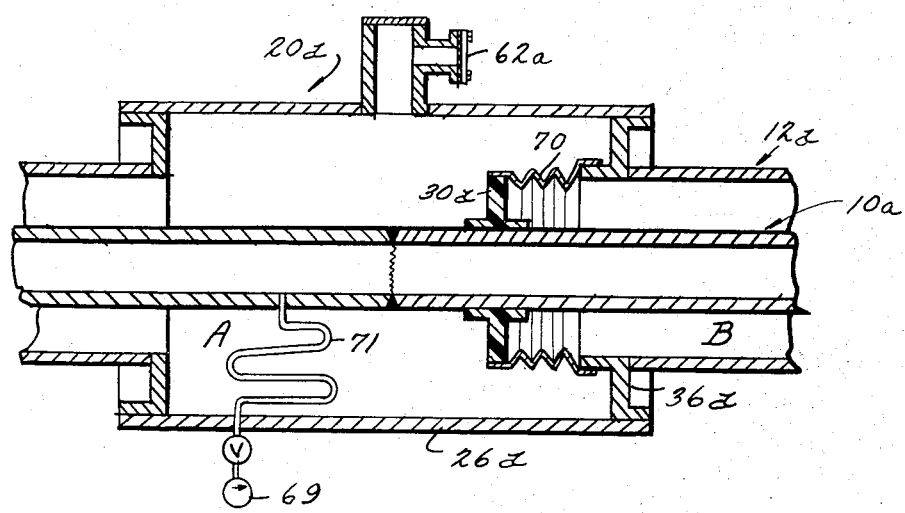
*Fig. 5.*
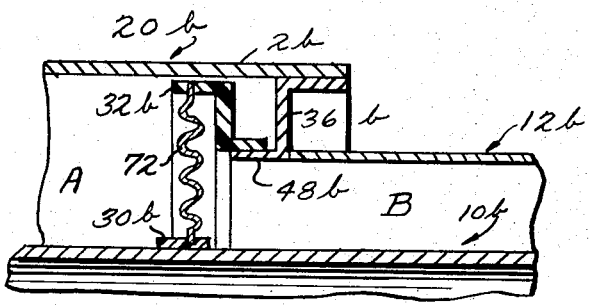
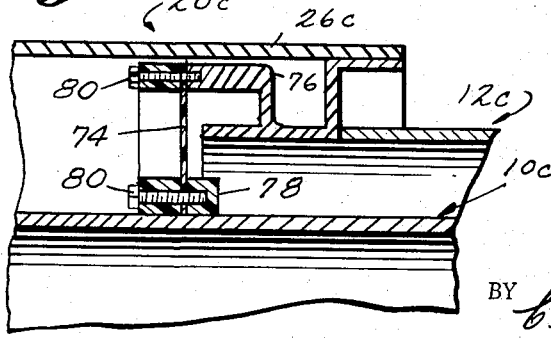
*Fig. 6.*
INVENTOR
JAMES H. ANDERSON
BY Cushman, Darby & Cushman
ATTORNEYS United States Patent Office 3,360,001
Patented Dec. 26, 1967

3,360,001
VACUUM JACKETED PIPE LINE AND JOINT
CONSTRUCTION THEREFOR
James H. Anderson, 1615 Hillock Lane, York, Pa. 17403
Filed Mar. 17, 1965, Ser. No. 440,527
7 Claims. (Cl. 137—375)

This invention relates to insulating vacuum jackets formed between an inner pipe-like member and an outer surrounding casing, and in particular to the construction of joints between discrete lengths of such concentric arrangements and to the separate maintenance of vacuum in the jackets of the discrete lengths.

In the pipe line transportation of natural gas and other normally gaseous hydrocarbons it has been found that there are engineering and economic advantages in transporting the material in a pressurized liquid state rather than in the gaseous state. To achieve the full economic advantage of liquid transport, the temperature of the liquid must be kept low, for example below −116° F. for liquid methane, in order to reduce the thickness and strength of the pipe required to withstand the pressure. The pipe line must therefore be thermally insulated, and it has been proposed to provide such pipe lines with an annular vacuum jacket for this purpose. Conveniently, a vacuum insulated pipe line is constructed of a relatively high strength inner piper for conducting cold, liquefied gas suspended within an outer concentric pipe with a vacuum maintained in the annular space between the two. Normally the outer pipe may be of relatively light weight construction because there will be no more than one atmosphere of pressure acting on it.

One consideration in constructing long pipe lines of this type is the desirability of separating the vacuum jacket into discrete sections, because it is more practical to evacuate separate sections, and because a leak in either the inner or outer pipe will destroy the insulating properties of the jacket. If the jacket is separated into sections any leak will affect only that section and, in addition, the leak will be relatively easy to locate and repair. A further consideration in the event of a leak in the inner, high-pressure pipe is the avoidance of pressure in the annular space sufficient to burst the outer, light-weight pipe.

Accordingly, the primary object of the present invention is to provide a vacuum insulated pipe line having axially spaced annular diaphragms or the like dividing the annular vacuum space into separate longitudinal sections, each of which will automatically vent to the atmosphere in the event of a high-pressure leak into that section.

It is a more specific object to provide a connector assembly between vacuum-jacketed lengths of a pipe line which effects the above-mentioned separate vacuum sections and vents.

It is a further object to provide a method of assembling a vacuum-jacketed pipe line having separate vacuum sections.

The invention will be further understood from the following detailed description taken in conjunction with the drawings in which:

FIGURE 1 is a side elevational view of a section of a pipe line incorporating a plurality of connector assemblies, each of which effects a seal between two lengths of a vacuum-jacketed pipe line and which provides for the venting of high pressure gas from the jacket in the event of a leak;

FIGURE 2 is a vertical axial section, in an enlarged scale, of one of the connector assemblies of FIGURE 1;

FIGURE 3 is a sectional view, on a slightly enlarged scale, taken on the line 3–3 of FIGURE 1;

FIGURE 4 is a fragmentary longitudinal sectional view of a different form of connector assembly employing a second type of diaphragm construction;

FIGURE 5 is a fragmentary view showing a third type of diaphragm construction; and FIGURE 6 is a fragmentary view showing a fourth type of diaphragm construction.

Referring to FIGURE 1 there is shown a vacuum-jacketed pipe line for conveying liquid methane from a pumping station 2 to a receiving station 4. The pipe line is constructed of an inner, high-strength pipe 10 and an outer, relatively low-strength pipe 12, each pipe being made up of sections 10′ and 12′ respectively. The inner pipe 10 is mounted concentrically within the outer pipe 12 with a minimum of contact between the mounting means and the walls of the pipes so as to reduce conductance of heat from the wall of the outer pipe 12 through the mounting means to the wall of the inner pipe 10.

As shown in FIGURE 2, the mounting means consists of a spoke-like arrangement which supports the inner pipe 10 from the outer pipe 12 in the manner of a hub within a wheel. This arrangement is more fully described in my application entitled, Vacuum Jacket Construction, Ser. No. 374,448 filed June 11, 1964. Briefly, the supporting arrangement includes a plurality of axially spaced rings 14 of low heat conducting material, such as plastic material, fixed to the exterior of the inner pipe 10 and a corresponding number of plastic rings 16 secured to the inner surface of the outer pipe 12. Spoke-like cables 18 of low heat conducting material, such as nylon, extend under tension between the inner and outer rings 14, 16 of each set to restrain axial and radial movement between the pipes 10, 12. Ordinarily it will be desirable to suspend one or more thin concentric layers 19 of heat reflective material on the cables 18 to improve the thermal insulation between the pipes.

The pipe line is made up of long lengths joined together and sealed from each other by connector assemblies which are illustrated at 20 and 20′ in FIGURE 1. These connector assemblies, which may be spaced apart a distance such as 1000 feet, serve as means for separating the annulus between the pipes into discrete sections A and B and as means for relieving high pressure in the annulus in the event of a leak in the wall of the inner, high pressure pipe 10. In the embodiment illustrated the lengths of the pipe line between the connector assemblies 20 include a plurality of inner and outer pipe sections 10′ and 12′ joined together in end-to-end relationship.

The relatively long lengths of pipe line between the connector assemblies 20 may be fabricated by making up, at the manufacturing plant, shorter lengths, each of which includes one or more sections 10′ of inner pipe suspended within a corresponding number of sections 12′ of outer pipe. The sections 10′ of inner pipe are of slightly greater length than the sections 12′ of outer pipe so as to project longitudinally beyond the ends of the latter, as seen in FIG. 1. These relatively short assemblies are then shipped to the pipe line site where they are set in end-to-end relationship, and the abutting ends of the inner pipe sections 10′ are welded together at 21. Then a wrapper sheet 22 is wrapped around each pair of spaced-apart ends of the outer pipe sections 12′ and is welded to the latter. The opposite ends of the resulting long pipe line lengths are then secured to connector assemblies 20 or 20′. Each long length between two connector assemblies is provided with a valved outlet 23 through which the annular space of the length can be evacuated with a vacuum pump (not shown).

As further shown in FIGURE 1, each outer pipe section 12′ is of corrugated construction except at the ends. The presence of the corrugations increases the flexibility of the outer pipe so that it is better able to withstand bending forces resulting from the heaving of the ground due to frost action and from forces resulting from longitudinal contractions and expansion of the pipe.

A complete connector assembly 20, as shown in FIGURE 2, includes an outer metal sleeve 26 of larger diameter than the outer pipe 12 and a pair of axially spaced ring-shaped diaphragms 28 which are sealed across the annular space between the inner and outer pipes 10 and 12. One of the diaphragms 28 defines the end of a vacuum section A, the other defines the adjacent end of a vacuum section B, and between them is another vacuum section C. Each diaphragm 28 is constructed of relatively flexible, gas impermeable material having low heat conductivity and having sufficient strength to withstand a pressure differential of at least one atmosphere across it. As seen in FIGURE 3 the diaphragms 28 are of two-piece split construction to permit easy assembly and are cemented together at 29. If desired, the diaphragms may be split with a single radial cut, or they may be constructed as uncut annular shapes. In the latter case the diaphragm is assembled by sliding it longitudinally over the end of an inner pipe section 10', while the split constructions permit assembly directly around the exterior of the pipe section 10'.

The inner edge of each diaphragm 28 is embedded in a ring 30 of plastic material which is bonded to the exterior surface of an inner pipe section 10'. The outer periphery is embedded in a ring 32 of plastic material which is supported from an outer pipe section 12' by means of two axially aligned, abutting ring-like members 34 and 36. The member 34 is provided at one end with an inclined annular flange 38 which is embedded in the outer plastic ring 32 adjacent thes outer periphery of the respective diaphragm 28 and with a second flange 40 which projects toward, but terminates short of the surface of the diaphragm 28. The other end of the ring-like member 34 terminates in a lip 42 which faces a similar lip 44 on the other member 36.

The two lips 42, 44 are clamped together with a gasket in between them by means of a V-band coupling 46 which tightly engages the outer surfaces of the lips. The ring-like member 36 consists of two concentric, offset cylindrical flange portions 48, 50 which are coaxial with the pipe line and which are joined together by an integral annular web portion. The inner cylindrical portion 48 is of the same diameter as the outer pipe sections 12' and is welded thereto at its junction with the web portion. The outer cylindrical portion 50 serves as a support for the sleeve 26, one end of which is welded to the portion 50 continuously around its periphery to form a vacuum-tight connection.

Intermediate its ends the sleeve 26 is provided with an outwardly extending pipe 52 which communicates with the vacuum space C between the two adjacent diaphragms 28. The pipe 52 carries two valved outlets 54, 56, one of which is connected to a vacuum pump 58 and the other of which is connected to a vacuum gauge 60. A laterally extending arm of the pipe terminates in an open end which is closed with a rupturable disk 62 held in place by a ring 64 and a plurality of bolts 66. The disk 62 is designed with sufficient strength to withstand a one atmosphere pressure differential and to burst in the event of a large rise in pressure within the space C occasioned by a leak of high pressure gas into that space from the inner pipe 10.

Referring more specifically to FIGURE 1, it will be seen that a bursting disk is omitted from alternate connector assemblies, the latter being illustrated at 20'. These modified assemblies 20' are otherwise identical to those described above in that they contain diaphragms 28' which separate a long vacuum jacket A from a jacket B.

To incorporate a connector assembly when constructing a long pipe line, it will usually be desirable to first make up and evacuate two or more lengths which will form a pair of jacket sections A and B. The lengths, which may be about 1000 feet, are made up at the location of the pipe line of pipe section 10' and 12' welded together as described above. The ends of the sections are provided with an outer pipe section 12' which leaves exposed a short portion of an inner pipe section 10'. A ring member 36 is then welded to each outer end section 12' and a diaphragm assembly consisting of a diaphragm 28, an inner and outer ring 30 and 32 and a ring member 34 is secured and sealed to the exterior of the exposed inner pipe section 10' in a position such that the members 34 and 36 abut each other. A V-band coupling 46 is then clamped to the lips 42 and 44 to complete the sealing off of the two adjacent sections A and B. The sections A and B may then be evacuated to, for example $10^{-5}$ in. Hg, by connecting a vacuum pump to the valved taps 23 (FIGURE 1) in the outer pipe 12. After testing the jackets for leaks, the two lengths of pipe line are connected by welding together the exposed ends of adjacent inner pipe sections 10' as shown at 68 in FIGURE 2. To complete the connector assembly 20 a sleeve 26, having an inside diameter greater than the outside diameter than the rings 32, is slid over the latter and is welded to flange portions 50 of the ring members 36. The space C within the sleeve 26 between the two diaphragms 28 is then evacuated through the outlet 54. The use of reflective layers in space C is not convenient but, if desired, these spaces may be filled with an insulating powder. A pipe line of any desired length may be built up by adding on successive lengths corresponding to additional jacket sections A and B.

In use the arrangement of FIGURES 1–3 restricts, to a single vacuum section A or B, the insulation-destroying effect of a leak in either the inner or outer pipe and provides for the release of pressure from the affected vaccum section in the event that the leak is in the wall of the inner, high pressure pipe 10. If, for example, high pressure gas leaks from the inner pipe 10 into vacuum section A of FIGURE 1, the respective diaphragm 28 will deflect to the right and will finally burst when the pressure reaches, for example, three atmospheres. Space C will thereby become pressurized, and the other diaphragm 28 will deflect to the right. However, this diaphragm will be prevented from bursting by deflecting into engagement with the flange 40 of its respective ring member 34. Simultaneously, the pressure in space C will act on the bursting disk 62 which will fracture at some predetermined design pressure. Thus, a high pressure leak in section A does not affect the vacuum in section B, and at the same time, the pressure is relieved so that there is no danger of bursting the outer pipe of section A or the sleeve 26 of the connector assembly.

In the event of a high pressure leak from the inner pipe 10 into a vacuum space C both diaphragms associated therewith will deflect into contact with their respective flanges 40 and thereby be prevented from breaking. As before, the bursting disk 62 will rupture at some pressure below that at which the sleeve 26 would be damaged.

An air leak into any of the spaces, A, B and C through the wall of the outer pipe 12 affects only the space between two diaphragms 28. The latter are designed to resist a pressure differential of one atmosphere and, consequently, they do not rupture except when a high pressure leak occurs.

Referring to FIGURE 4 there is shown a modified connector assembly 20a which employs a cylindrical bellows 70 as a rupturable seal between inner and outer pipes 10a and 12a. As shown, the assembly includes a plastic ring 30a bonded to the exterior of the inner pipe 10a, and the bellows 70 is bonded at one end to the outer periphery of the ring 30a and at its other end to the flange portion 48a of the ring member 36a. In this embodiment there is only one bellows 70 within the connector assembly 20a. Thus, vacuum section A in FIGURE 4 is at all times open directly to the bursting disk 62a. The latter is designed to rupture at a lower pressure differential than is the bellows 70 so that a high pressure leak in section A will not affect the vacuum in section B. A high pressure leak in the latter will blow out through a bursting disk associated with a similar connector assembly at the other end of section B. That is, each vacuum section A and B is provided with a separate bursting disk. FIGURE 4 also shows a pressure gauge 69 disposed outside the connector assembly 20a for measuring the pressure within the inner pipe 10a. The gauge 69 connects with the pipe 10a by means of a small diameter valved tube 71 which is of relatively great length so as to reduce heat leakage. If desired, the tube 71 may be employed to remove liquid from the pipe 10a.

FIGURE 5 shows a third form of sealing the end of a vacuum section A or B. In this construction a connector assembly 20b includes a wavy, radially disposed diaphragm 72 sealed to an inner plastic ring 30b and an outer plastic ring 32b. The inner ring is bonded to the exterior of the inner pipe 10b, and the outer ring 32b is bonded to the flange portion 48b of the ring member 36b.

FIGURE 6 illustrates a fourth form of connector assembly 20c in which an annular diaphragm 74 is clamped in place between the parts of a two-piece outer ring member 76 and a two-piece inner ring member 78. The mating pieces of the ring members are held together by a plurality of bolts 80. The outer ring member 76 is similar to that shown in FIGURE 2 except that the former is constructed integrally with the element which joins the sleeve to the outer pipe. One advantage of the clamping arrangement of FIGURE 6 is that it permits easy reassembly of a new diaphragm after accidental breakage of the previous diaphragm.

It will be apparent that modifications to the above-described illustrative examples are possible within the scope of the present invention and, accordingly, it is not intended that the above details be limiting except as they appear in the appended claims.

What is claimed is:

1. A thermally insulated pipe line structure for transporting a stream of high pressure fluid comprising: an inner pipe member suspended within an outer pipe member of lesser bursting strength than said inner pipe member and defining therewith an annular space which when evacuated reduces heat transfer between the pipe members; two axially spaced-apart sealing means extending across said annular space and dividing said annular space into two elongated annular sections and a third annular section, said third annular section being disposed between said sealing means and being of small axial length relative to said elongated sections, each of said sealing means including means responsive to a predetermined high fluid pressure in the respective elongated annular section for passing fluid from that section into said third annular section and for preventing passage of high pressure fluid from said third annular section into either of said elongated annular sections; and pressure responsive means associated with said third annular section for automatically venting pressurized fluid from said third annular section to the outside of said pipe structure upon an increase in pressure occasioned by passage of fluid through either of said sealing means whereby an increase in pressure in one of said elongated annular sections caused by a leak in the wall of said inner pipe in said one elongated annular section will be relieved through the respective sealing means into said third annular section and then through said vent means without affecting the vacuum in the other elongated annular section and whereby said outer pipe is protected from excessive internal fluid pressure which would develop during a leak.

2. A pipe line structure as in claim 1 wherein each of said means for passing fluid from an elongated annular section into said third annular section includes a deflectable, rupturable member and further includes means in the respective elongated annular section for engaging and reinforcing said deflectable member whereby said deflectable member may rupture into said third annular section but not into the respective elongated annular section.

3. A pipe line structure as in claim 2 wherein said deflectable, rupturable member is a thin, annular disk surrounding said inner pipe member.

4. A pipe line structure as in claim 1 wherein said venting means includes a bursting disk constructed to rupture at said predetermined pressure.

5. A pipe line structure as in claim 1 wherein said outer pipe member includes at least two adjacent parts each constructed of a plurality of relatively short pipes of uniform diameter joined end to end and an outer sleeve of greater diameter than said pipes sealed to the adjacent ends of said parts; said sealing means being disposed between said parts and within said sleeve.

6. A pipe line structure as in claim 1 wherein each of said sealing means is constructed to pass fluid from the respective elongated annular chamber at pressures above atmospheric pressure whereby a leak in said outer pipe member does not result in the passage of fluid through said sealing means.

7. A thermally insulated pipe line structure comprising: a high strength inner pipe member for carrying high pressure fluid; a relatively low strength outer pipe member defining an evacuated annular space around said inner pipe member; means for protecting said outer pipe member from high internal pressure resulting from a leak in said inner pipe member and for locating the loss of vacuum due to such leak, said means including a plurality of axially spaced-apart sealing members extending across said evacuated annular space and dividing the latter into a plurality of distinct evacuated annular sections, said means further including normally closed pressure-responsive vent means for automatically venting pressurized fluid from the respective annular section to the outside of said outer pipe upon an increase in pressure in said respective annular section to a predetermined value, each of said sealing means having sufficient strength to resist a pressure differential across opposite sides thereof at least equal to said predetermined value whereby a rise in pressure in any of said annular sections due to a leak in said inner pipe member will be vented to the outside of said outer pipe without creating high internal pressure on said outer pipe member and without affecting the vacuum in the other annular sections.

References Cited

UNITED STATES PATENTS

| 1,140,633 | 5/1915 | Trucano | 285—133 X |
| 2,766,904 | 10/1956 | Philip. | |
| 3,044,479 | 7/1962 | Meyer et al. | 137—68 |
| 3,146,005 | 8/1964 | Peyton | 138—148 X |
| 3,192,946 | 7/1965 | Wiersholm | 137—375 |
| 3,246,917 | 4/1966 | Martin | 285—47 |

HENRY T. KLINKSIEK, *Primary Examiner.*

M. CARY NELSON, *Examiner.*